Nov. 20, 1945.                J. E. WOODS                2,389,175
                 METHOD OF MAKING HEAT EXCHANGE APPARATUS
                          Filed Oct. 7, 1942
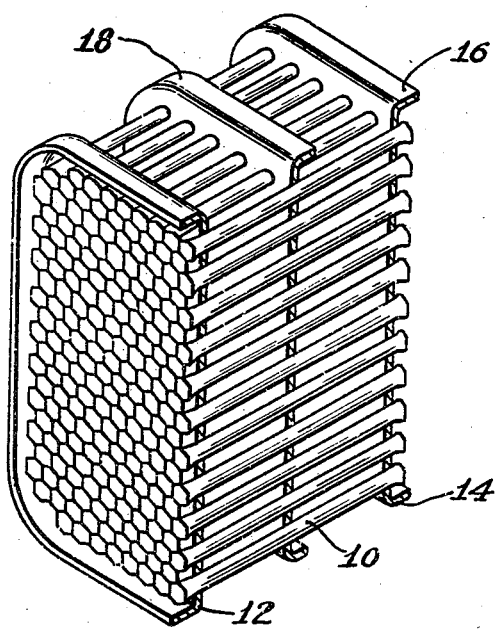
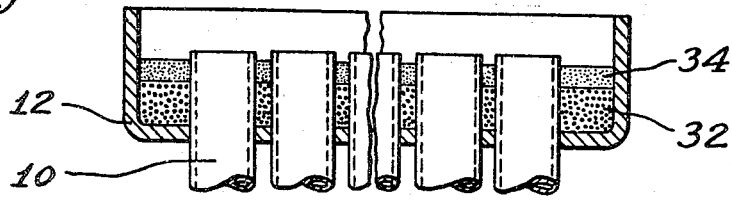
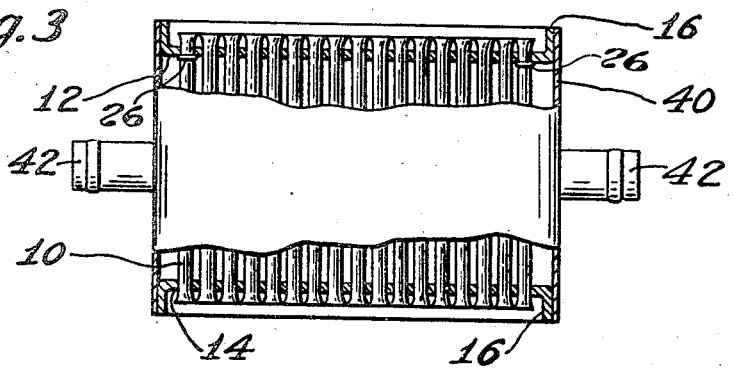
Inventor
John E. Woods
by his attorney
Melvin R. Jenney Patented Nov. 20, 1945

2,389,175

UNITED STATES PATENT OFFICE 2,389,175

METHOD OF MAKING HEAT EXCHANGE APPARATUS

John E. Woods, Brookline, Mass., assignor to Clifford Manufacturing Co., Boston, Mass., a corporation of Delaware Application October 7, 1942, Serial No. 461,109

4 Claims. (Cl. 113—112)

The present invention relates to methods of making heat exchange apparatus, and is more particularly concerned with the manufacture of heat exchange apparatus employing closely spaced thin-wall tubes, useful as radiators, oil coolers, inter-coolers, and the like. This application is a continuation in part of my copending application Serial No. 389,769, filed April 22, 1941, now Patent No. 2,298,996, granted October 13, 1942.

Apparatus of this kind has ordinarily been made by assembling hexed end tubes (usually of copper) in a honeycomb bundle and soldering the hexed ends together, usually by dipping in soft solder. The tanks or casings are attached to the outside tubes of the bundle, also by soft solder.

By soft solder is meant any of the commercially available solders having melting points approximately in the range of 381° to 595° F. The apparatus manufactured with soft solder has a number of serious limitations. The joints between the tube ends do not afford sufficient structural strength and rigidity for the assembly. Mechanical stresses applied to the casings are communicated to the tube joints, particularly those of the outside rows, and result in the appearance of leaks. These mechanical stresses are frequently due to vibration effects, since apparatus of this kind finds its most important use in the aircraft industry.

One of the principal reasons for the use of soft solder is to prevent destruction of the tubes in the dipping operation. Hard or high melting solders or brazing compounds, with melting points ranging from 1175° to 1600° F., are commercially available, but the manufacture of heat exchangers from thin-wall tubes by the use of such solders is not feasible because the dipping operation in a bath of such material would result in immediate destruction of the thin tube ends by dissolution in the large mass of brazing compound.

The difficulties noted above are even greater in the case of aluminum, which would be highly desirable because of its light weight in the manufacture of equipment for use in aircraft. The only available brazing alloys for use with aluminum have melting points of the order of only 100° F. lower than that of the aluminum itself, and any standard soldering or brazing operation by dipping or otherwise can not be carried out without immediate destruction of the tubes. As a consequence, no successful manufacture of heat exchangers with thin-wall tubes has heretofore been carried out.

According to the present invention, heat exchange apparatus is constructed of thin-wall closely spaced tubes by assembling the tubes in relatively heavy headers which contribute markedly to the strength and rigidity of the assembly, bonding the tubes to the headers, and securing the headers to a heavy and structurally strong tank or casing. This construction is applicable to copper, aluminum, and other non-ferrous metals or alloys, as desired, and has been found to avoid most of the disadvantages inherent in the earlier construction.

The tubes are straight, and of uniform diameter, and are therefore relatively inexpensive, not only because of the small number of manufacturing operations required, but also because they are not subjected to damage by initial hexing or bulging operations. The mechanical stresses applied to the tanks are taken up by the heavy headers and are not directly communicated to the tube assembly, as will appear in the specific description.

Although header constructions are not new, their use has been mainly limited to boilers, economizers, etc., employing thick tubes which may be expanded into the headers. Such expanding operations are not feasible with thin-wall tubes, with which the present invention is concerned. By thin-wall tubes is meant tubes which are usually of the order of .005" and in no case greater than $\frac{1}{64}$" in wall thickness.

Header constructions have also been proposed for widely spaced tubes, in which the tubes may be securely supported in drifted or flanged holes. This construction is likewise not feasible for closely spaced tubes, wherein the distance between tube centers in any row is only slightly greater than the tube diameter. So far as I am aware, no header construction with closely spaced thin-wall tubes has heretofore been successfully made.

Preferably the tubes are secured to the headers by brazing or hard soldering, and one feature of the invention contemplates the use of a brazing or soldering compound in measured amounts, sufficient to establish an adequate bond, but without danger of tube destruction in the process of manufacture. The hard solder bonds are important in enhancing the strength of the apparatus and they place no limitations on the temperatures of the fluids which can be handled by the equipment. The invention is applicable to aluminum as well as copper tubes.

Other features of the invention consist of certain methods of manufacture hereinafter described and particularly defined in the claims.

In the accompanying drawing, Fig. 1 is a perspective view of a core assembly according to the present invention; Fig. 2 is a detail view illustrating the method of preparing the assembly for the brazing operation; and Fig. 3 is a sectional view of the complete assembly.

In the illustrated embodiment of the invention, the tubes 10, which are drawn or extruded from copper, brass, aluminum, aluminum alloy or other non-ferrous metal, are inserted in closely spaced punched holes in the headers 12 and 14. The tubes are of thin-wall structure on the order of .005″ to .007″ in wall thickness. The headers are either of the same material as the tubes or of material compatible therewith. For example, brass, copper or Monel headers may be used with copper tubes, and aluminum or aluminum alloy headers with aluminum tubes. The headers comprise flat sheets provided with peripheral flanges 16 to stiffen the sheets and provide for attachment to the shell or tank. The tube receiving holes in the headers are closely spaced, the spacing between holes in any row being only slightly greater than the tube diameter. As an example, one construction in commercial use employs tubes .268″ in diameter spaced .313″ on centers.

An intermediate header 18 may be used for affording additional support for long tubes, for more secure attachment to the tank, for baffling, or other purposes. In apparatus of the conventional headerless type, the intermediate support has been provided by forming small bulges in the intermediate portion of the individual tubes so that the bulges of adjacent tubes contact one another, but that method is unduly expensive. In the present invention, one or more intermediate supporting plates may easily be included in the assembly. The headers and intermediate plates are supported the proper distance apart in a suitable jig, with the holes in register, and the tubes are passed through the holes. The end portions of the tubes protrude uniformly, as shown in Figs. 2 and 3.

For the bonding of the tubes to the headers, a measured amount of high melting brazing compound is provided at the joints. The brazing compound is only sufficient in amount to afford the proper alloying action and penetration of the compound into the material of the tubes and headers, but without danger of tube destruction.

The preferred method of applying the brazing material to the assembled tubes and headers consists in using brazing material in the form of loose granules or "gravel," as shown in Fig. 2. For a copper assembly, the granules are in the form of silver alloy or silver solder having a melting point of 1175° F., or perhaps somewhat higher. For an aluminum assembly, granules of aluminum brazing alloy are preferably used. The assembly of headers and tubes is then set up with the headers in a substantially horizontal position, after which the granules of brazing material 32, of a size varying from a fine powder to 0.025″ may be poured onto the top of the header. Since such particles as fall into the tubes will drop out the other end and may be collected no particular care is required in applying the brazing material. Preferably the assembly will be shaken to assist in uniformly distributing the granules over the surface of the header and around each of the tubes. Flux for the brazing operation is then applied in similar fashion, in the form of discrete particles 34 of small size uniformly distributed over the particles of brazing alloy and around the tubes.

The assembly is then placed in a brazing oven with the tubes vertical and is brought to a temperature sufficient to melt the brazing compound. The upper header and the intermediate plate are supported by a few beaded tubes 26, inserted at the start of the tube-assembling operation. In the brazing oven the tubes are heated by circulation of hot air therethrough. Since the brazing compound is on the upper side of the top header, proper flow of compound into and around the tube joints by gravity is assured.

Two operations are required. After one end of the assembly is treated as above described, the assembly is taken out and turned over, and the other end is provided with alloy and flux and the assembly is heated for the second brazing operation. Since the oven is heated by down currents of hot air or gas, the top of the assembly is heated more rapidly than the bottom, and consequently the brazing may be completed at one end without melting the compound at the other end. This method is advantageous for aluminum equipment because it does not require prolonged overheating of the assembly.

The method therefore provides a heavy header construction in which all of the joints are formed by a hard solder or brazing alloy, as distinguished from the soft solder method commonly used on hexed tubes. In the present invention, the amount of brazing compound is only sufficient to insure penetration thereof into the tube walls to an extent to form proper bonds, but without danger of tube destruction.

Since each tube is surrounded by brazing material as a result of the uniform distribution of the granules, the heat conduction to all parts of the tubes and headers is excellent. In addition, since the granules of brazing material and of flux are in intimate association throughout the mass, the brazing material readily bonds to all portions of the joints as soon as the temperature of the parts has reached the required temperature.

For aluminum, the granules of brazing alloy and of flux are of approximately the same density, with the result that the flux and alloy become mixed upon heating, and the flux is available at the bonding surface. The particles of brazing compound and flux originally fill up most of the spaces between the tubes, since they are in loose form, but upon melting, the brazing compound compacts into a thin layer which bonds tightly with the headers and tubes.

The method of Fig. 2 has been found to possess some decided advantages. It has been noted that one of the difficulties in manufacture has been the tendency for the brazing compound to flow toward certain joints and away from others. This "robbing" action seems to be due in some measure to non-uniform heating of the parts. Actually this is a serious difficulty, since the tubes, being relatively thin, heat more rapidly than the headers and tend to draw the brazing alloy away from the headers. According to the present invention, there is a substantial body of metal in intimate contact with both the tubes and headers, so that heat is readily conducted to all parts thereof.

After removal from the brazing furnace, means are provided to reduce the head resistance of the tubes. This is most conveniently accomplished by hexing the tube ends, as shown in Figs. 1 and 3. The hexing is preferably done with a gang hexing tool, which forms the ends of a number of the tubes simultaneously. Although some of the tube ends may be split by this operation, the splits are of no consequence, since the only purpose of the hexing operation is to enlarge the face area, no reliance being placed on the hexed ends for fluid seals or structural rigidity. Thus the aerodynamic advantages of the common honeycomb radiator are obtained, but with the additional advantages arising from the header construction.

The tank or shell 40 (Fig. 3), having the usual fluid inlet and outlet connections 42, is preferably applied as the final step. The tank is placed over the tube and header assembly and is securely attached to the header flanges 16, conveniently by torch brazing. Since the tank is attached to the headers, instead of to the relatively fragile tubes, it is unnecessary to rely on soft solder. Owing to the thickness of the header and tank material, the connection may be made with hard solder or brazing compound, without damage. If desired, the attaching operation may be carried out by line welding, either instead of or in addition to the brazing process.

The steps above described need not be carried out in the exact order specified. For example, the hexing of the tube ends may be performed after the attachment of the tank.

Heat exchange apparatus made according to the present invention is characterized by great structural strength and rigidity. Mechanical stresses applied to the structure, by vibration or otherwise, are borne by the heavy tank and headers and are not communicated to the tubes or to the joints between the tubes and headers. The bonds between the tubes and headers, and between the headers and tank, have high mechanical strength and are of sufficiently high melting point to permit use of the equipment under the most severe temperature conditions. Furthermore, such equipment is not limited to copper constructions, but may be used with other materials, notably aluminum, which is advantageous because of its light weight.

The intermediate plate 18, which has been described as a tube-supporting plate, may also be used as a baffle or bulkhead. One or more of such plates may be employed for baffling purposes, and may be of such contours as to direct the flow of fluid in any desired manner externally of the tubes. It will be understood that baffles or intermediate plates cannot be used in the conventional construction employing tubes which are necessarily expanded at their ends before assembly. In the present case, where tubes of uniform cross-section are used (except for a relatively small number of tubes with single bulges for supporting purposes), the assembly with baffles and intermediate plates of any desired number and configuration presents no difficulty.

Having described my invention, I claim:

1. In the manufacture of heat exchange apparatus comprising a plurality of closely spaced thin-wall metal tubes mounted in headers having unflanged tube receiving openings, the method of bonding the tubes to the headers which comprises applying brazing material to the headers in the form of loose discrete particles of the general size of 0.010" to 0.025", distributing the brazing material around the tubes to a substantially uniform depth on the headers, applying flux above the brazing material in the form of particles of small size, and thereafter raising the assembly to brazing temperature.

2. In the manufacture of heat exchange apparatus comprising a plurality of closely spaced thin-wall metal tubes mounted in headers having unflanged tube receiving openings, the method of bonding the tubes to the headers which comprises applying brazing material to the headers in the form of granules, applying flux in granular form above the brazing material, distributing the granules of brazing material and flux uniformly over the header and around the tubes, and thereafter raising the assembly to brazing temperature.

3. In the manufacture of heat exchange apparatus comprising a plurality of closely spaced thin-wall tubes of light metal mounted in headers having unflanged tube receiving openings, the method of bonding the tubes to the headers which comprises applying brazing material in granular form to the headers and between the tubes, applying flux in granular form above the brazing material, the flux and brazing material being of approximately similar densities, and thereafter raising the assembly to brazing temperature.

4. In the manufacture of heat exchange apparatus comprising a plurality of closely spaced thin-wall metal tubes mounted in headers having unflanged tube receiving openings, the method of bonding the tubes to the headers which comprises applying brazing material to the headers in the form of granules, applying flux above the brazing material in the form of particles of small size, distributing the granules of brazing material and flux uniformly over the header and around the tubes, and thereafter raising the assembly to brazing temperature.

JOHN E. WOODS.